April 21, 1931.  E. E. PRYOR  1,801,456
FISHING TOOL
Filed Nov. 5, 1928  3 Sheets-Sheet 1
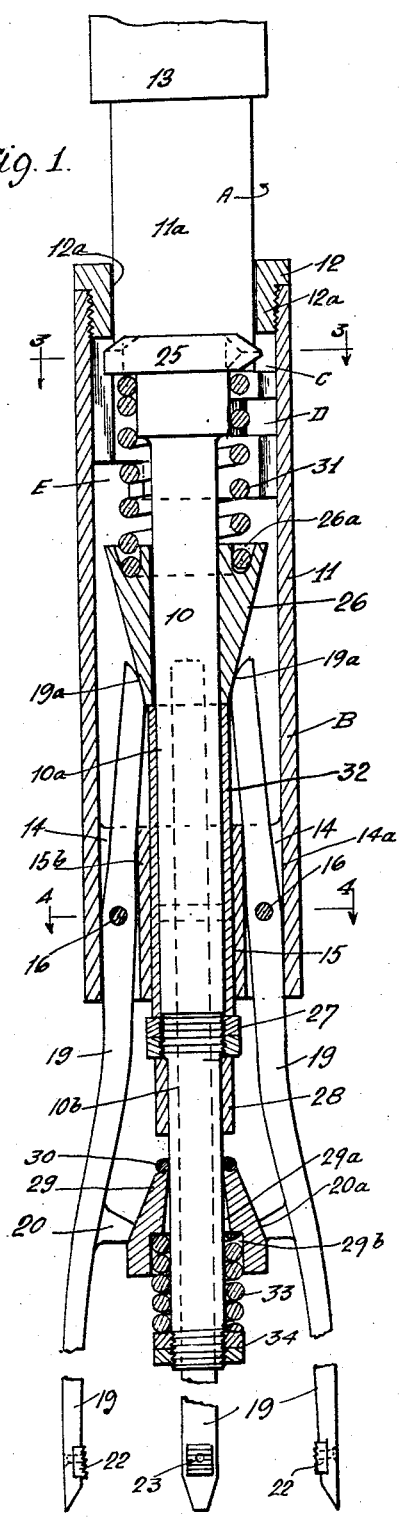

April 21, 1931.  E. E. PRYOR  1,801,456
FISHING TOOL
Filed Nov. 5, 1928  3 Sheets-Sheet 2
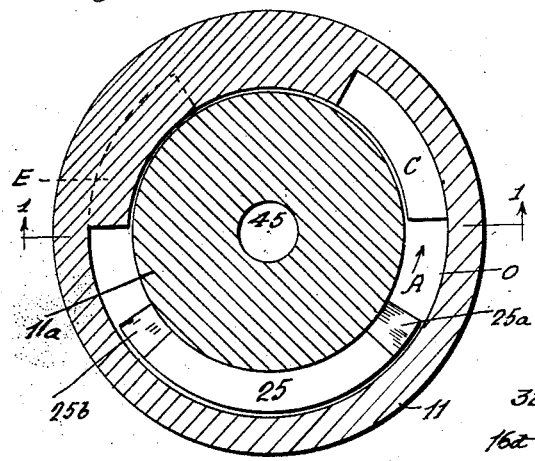
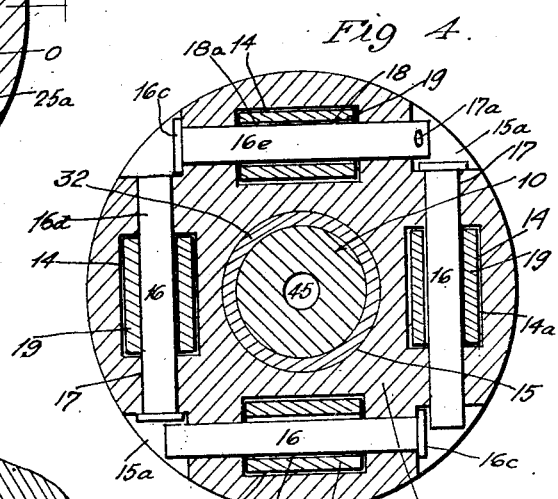
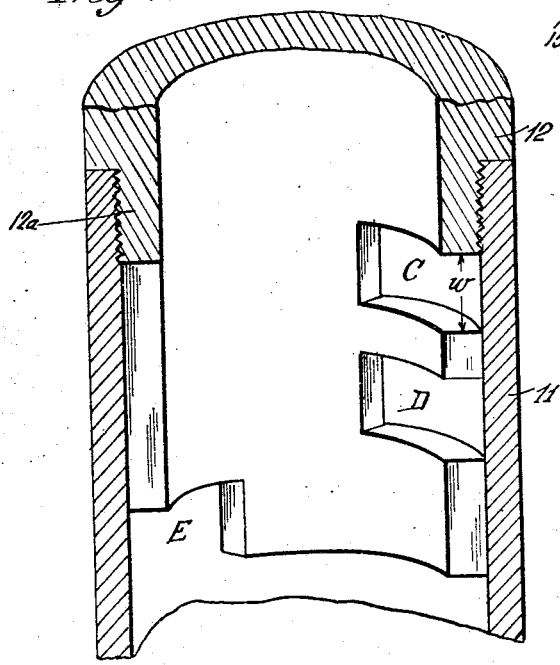
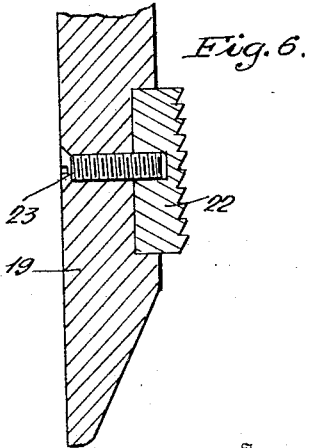
Inventor
Elmer E Pryor
By
Attorney April 21, 1931.  E. E. PRYOR  1,801,456
FISHING TOOL
Filed Nov. 5, 1928   3 Sheets-Sheet 3
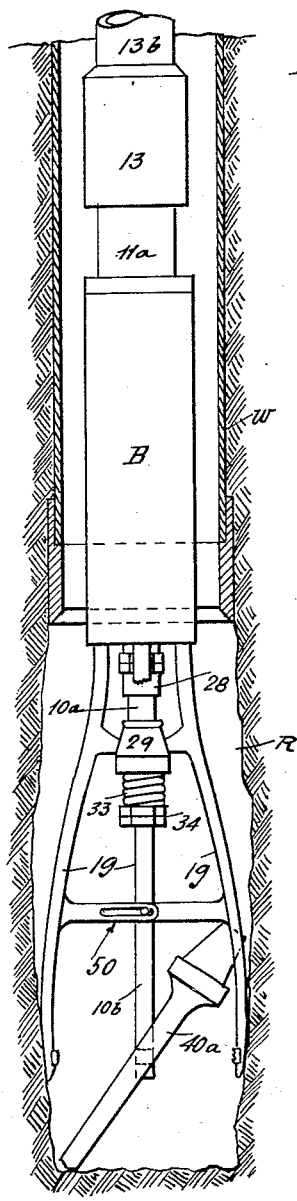
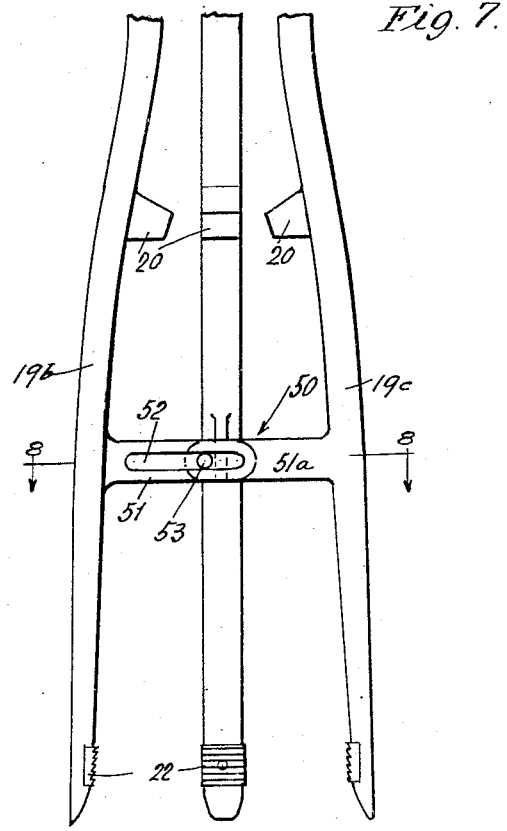
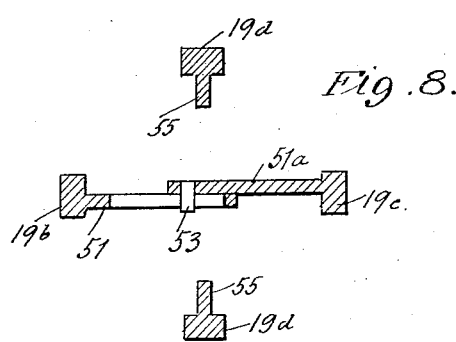
Inventor
Elmer E. Pryor.
By
Attorney Patented Apr. 21, 1931

1,801,456

UNITED STATES PATENT OFFICE

ELMER E. PRYOR, OF FULLERTON, CALIFORNIA

FISHING TOOL

Application filed November 5, 1928. Serial No. 317,360.

This invention relates generally to fishing tools for use in oil wells, and is particularly concerned with a tool of this character that is extremely effective and reliable in recovering articles such as tubing or drilling tools that have become disconnected or broken and lodged within well.

The present invention is particularly well adapted for embodiment in fishing tools having certain general characteristics of the tool comprising the subject matter of the co-pending application on fishing tool, Serial No. 160,553, filed January 12, 1927, by George M. Wilson and Elmer E. Pryor, wherein there is provided a plurality of radially movable grapple arms adapted to be spread within the well in such manner as to be in position for engaging a lost article or fish. This type of tool is particularly advantageous because of its range of operation, that is, it may be adjusted to grip a fish of any size or shape, within reasonable limits.

As a further advantage the construction of the tool is such that the arms may be spread to an extent greater than the diameter of the well casing through which the tool, in collapsed condition, has been lowered, so that in the event the fish becomes lodged in a "caved-in" region in the side of the well, the arms may be spread sufficiently to engage the fish and to move it to a central position in the well, said position being such that the tool may be suitably applied to grip the fish.

The tool has such characteristics that when it is adjusted to suitable work engaging position, the arms are caused not only to grip the fish securely, but thereafter to be constantly and forcibly urged into tight engagement with the fish while it is being hoisted out of the well. It has been found that due to its simplicity of construction and operation, the present device is of unusual dependability in carrying out fishing operations.

Numerous additional features and advantages of the invention will be made apparent in the following detailed description of a typical embodiment thereof, reference being made in the description to the annexed drawings, in which:

Figure 1 is a sectional elevation of the invention, the grapple arms being shown spread apart or in open position;

Fig. 2 is a view generally similar to Fig. 1, but showing various parts in changed position and the arms in gripping engagement with a fish;

Fig. 3 is an enlarged horizontal section on line 3—3 of Fig. 1;

Fig. 4 is an enlarged horizontal section on line 4—4 of Fig. 1;

Fig. 5 is an enlarged fragmentary view of the upper interior of the barrel showing the barrel bushing and its depending segmental collar portion;

Fig. 6 is an enlarged fragmentary view of the lower end portion of an arm showing a preferred means of mounting a removable gripping element on the arm;

Fig. 7 is an enlarged view of a lower portion of the arms showing the stop arm assembly;

Fig. 8 is a section on line 8—8 of Fig. 7; and

Fig. 9 is a view showing the tool suspended within a well and with the arms in wide spread position for removing a fish from a "cave in" portion of the well.

Referring particularly to Figs. 1 and 2, I have shown a barrel B through which a tubular mandrel 10 extends. The barrel includes a sleeve portion 11 into which is threaded at its upper end a bushing 12. The bushing has a central bore 12a through which the upper shank 11a of the mandrel extends and has sliding fit. The mandrel and barrel are capable both of limited relative longitudinal and rotational movement as will later be made apparent. It will suffice at present to note that the shank 11a of the mandrel is connected to the lower end 13 of the usual pipe string 13b, and that the mandrel may be raised and lowered or rotated within the barrel by correspondingly moving the pipe string from the ground level.

The lower end of the barrel bore is partially closed off by the internal head 15b, there being provided through this head a plurality of longitudinally extending arm ways 14, radially spaced from a central bore 15. One arm way is provided for each grappling arm of which there may be any suitable number, four being spaced 90° apart about bore 15, as shown, usually being most suitable. Extending horizontally through the arm ways are heavy retention pins 16, the pins being inserted through bores 17 in the head through transverse apertures 18 in the arms 19.

The outer cylindrical surface of the barrel is grooved at 15a to permit the pins to be inserted as shown. Each pin is headed at 16c, and each, except pin 16d, is of sufficient length to extend part way across the head of an adjacent pin and thus serving to lock said adjacent pin against backing out movement. The assembly of heads, arms and pins is locked together by means of cotter key 17a, inserted through the key pin 16e. Apertures 18 have clearance 18a from the retention pins in order that when under severe stress, the pins may be permitted to bend slightly. The arms have pivotal movement about the retention pins in axial planes of the barrel, their pivotal movement being limited by the defining walls 14a of the armways 14.

Preferably arms 19 are made of somewhat resilient material so that they may be permitted to flex outwardly along their lower portions, that is, their extents below pins 16, and to have unusually wide spread when in their open position. Since, as will be seen later, it is desirable that the arms be caused to bend only along their lower extents, any suitable means may be employed for preventing their bending at the upper ends. Although the arm portions above pivots 16 may be formed of nonflexible material, in the present instance I have preferred to locate the pivots at such points that the upper extents of the arms are short compared with their lower extents and therefore are not subjected to appreciable bending. At their upper ends the arms are provided with cam faces 19a and have lugs 20, with cam faces 20a, formed on the inner sides of their lower portions. A removable gripping element 22, for instance, a die, is provided for each arm, and it may be joined thereto in any suitable manner, preferably by screw 23 threaded into the element from the outer side of the arm.

The grapple arms are provided, at a suitable location below lugs 20, with a stop assembly generally indicated at 50 and shown in detail in Figs. 7 and 8. Oppositely disposed arms 19b and 19c are provided with relatively slidable stop arms 51 and 51a, respectively, the former having a slot 52 in which pin 53, mounted on arm 51a is adapted to slide as the arms are moved toward or away from each other. Stop lugs 55 are formed on the other pair of arms 19d, these lugs being adapted closely to approach arms 51 and 51a when the several grapple arms are drawn closely together, as will be described. It may be stated at this point that the purpose of the stop assembly is to provide means for resting the arm and barrel assembly on the upper end of the fish in order to permit subsequent downward and rotational relative movement of the mandrel, and in so doing to bring the grapple arms into gripping engagement with the fish.

Referring to Fig. 1, it will be seen that with the mandrel shank 11a of a given diameter to have sliding fit through the bushing, the central portion 10a of the mandrel is of relatively less diameter and the lower portion 10b of diameter somewhat less than portion 10a. Spring 31 encircles portion 10a and bears at its upper end against a segmental flange lug 25 formed immediately below shank 11a of the mandrel, and which will later be described in detail. The spring is confined at its lower end in an annular groove 26a formed in the upper end of the downwardly pointing wedge cam 26 slidably mounted on the mandrel, the cam preferably having a conically shaped surface.

In the position of Fig. 1, downward movement of the cam on the mandrel is limited by means of the mandrel collar 32, the latter having a sliding fit in the barrel head bore 15, and held against downward displacement on the mandrel by means of lock nuts 27 threaded on the lower portion 10b of the mandrel. A bore 45 extends continuously through the mandrel and serves in the usual manner to permit the discharge of circulating fluid from the tubular pipe string 13b through the mandrel and to the working region of the grapple arms.

Bearing upwardly against lock nuts 27 is a second collar 28 which is adapted to limit the upward movement, relative to the mandrel, of a lower and upwardly pointing wedge cam 29, a ring bearing 30 being placed between collar 28 and the lower cam. Cam 29 preferably has a downwardly diverging bore 29a to permit of tilting or canting lateral movement of the cam relative to the mandrel, and therefore to enable the cam to be self-adjusting on the mandrel. The lower cam is urged upwardly on the mandrel by means of spring 33 seated in the annular groove 29b of the cam and confined at its lower end by means of lock nuts 34 threaded on the mandrel. These lock nuts may be employed, if it is desired, to adjust the tension of spring 33.

Thus it is seen that with the barrel and mandrel arranged for vertical relative movement, and with the vertically extending grapple arms pivotally mounted intermediate their ends on said barrel, the wedge cams on the mandrel serve to swing the arms radially in opposite directions when the mandrel is moved vertically in opposite directions.

The upper spring 31 preferably is of relatively greater strength than the lower spring 33, reasons for which will be apparent from a later description of the operation of the device. Also the angularity of the wedge face 29c of the lower cam preferably is greater than that of wedge face 26b of the upper cam.

As shown in Fig. 5, the barrel bushing 12 has a lower depending segmental portion 12a having a general shape corresponding to that of a substantially semi-circular collar segment. Although the segmental collar portion may be mounted or formed within the barrel sleeve 11 in any suitable manner, or any other suitable means may be employed for providing a lug engaging shoulder within the barrel, I have provided a collar segment which is preferably and most easily formed integral with the bushing. Segment 12a is cut away at each side to form open end and horizontally extending slots C and D in one side of the segment, and slot E at the bottom of the other side, these slots being of any suitable depth, and having width W slightly greater than the thickness T (see Fig. 2), of the lug 25. The slots are located at vertically spaced intervals for purposes that will later be described.

The mandrel flange lug 25 preferably has less than a semi-circular extent; for instance, it may have an angular extent of about 120°. One end of the lug is pointed as at 25a, this end or nose being adapted to be rotated into grooves C and D of bushing segment 12a, while the other end of the lug has an upper bevel face 25b, which is adapted to fit in slot E. The lug is beveled as described to facilitate its insertion within the slots.

It may be noted at this point that the grapple arms have three positions of adjustment, the wide spread position being that illustrated in Figs. 1 and 9. As the mandrel is moved downward through the barrel until collar 28 engages the ring bearing 30, thereby providing backing for the lower cam, the tension of spring 33 is somewhat relieved and similarly the upward thrust of the lower cam tending to spread the arms lessened; and the arms by virtue of the spreading action of the upper cam on their upper ends are relieved somewhat from bending stresses and caused to move radially inward at their lower ends. This position of the arms may be termed their intermediate position, little downward movement of the lower cam relative to the arm lugs 20 having taken place during the adjustment to this position from the wide open position of the arms. The arms are brought to their innermost or closed position by further downward movement of the mandrel in which movement the lower cam 29 is moved downward away from lugs 20 to the position shown in Fig. 2.

Similarly the mandrel has three vertically spaced locking positions of adjustment, relative to the barrel 11, these determining the open, intermediate and closed positions of the arms as described, and corresponding respectively to the location of slots C, D and E. It will be apparent from inspection of Fig. 1 that normally, spring 31 tends to hold the barrel on the mandrel in the position shown and with the grapple arms in wide spread positions. When, through the medium of the drill stem, the mandrel is turned in the direction of arrow A, see Figs. 1 and 3, the mandrel, in its uppermost position, is turned accordingly and flange lug 25 thrust into slot C to lock the arms in wide spread position. By reverse turning of the drill stem the lug may be brought out of slot C, and by subsequently lowering the mandrel lug to position opposite slot D, the lug may be thrust into this slot to lock the arms in their intermediate position of adjustment. Finally, by lowering the mandrel still further the mandrel may be thrust into the lowermost slot E to lock the grapple arms in the contracted position shown in Fig. 2.

It will be noted that due to the resilient nature of the arms, they are capable of radial positioning by bending to extents intermediate the locking positions defined by the position of the slots. Therefore the arms are capable of fine radial adjustment due to their resiliency, even though their locking position of adjustment, corresponding to the spacing of the bushing slots, is relatively coarse.

In carrying out fishing operations with the present device, the mandrel shank 11a is crewed into the lower end of pipe string 13b, and the tool inserted within the well casing. It will be noted that while the tool is being lowered within the well, flange lug 25 may be placed in the rotational position relative to the barrel, shown in Fig. 3, in which event the thrust exerted by lugs 20 upon cam 29 is due only to the weight of the barrel. Since, however, this weight, combined with the upward thrust of the cam exerted by spring 33, is sufficient to cause the arms to flex outwardly to an extent greater than the cross section area of the casing, it will be seen that as the tool is lowered, the grapple arms are caused to press against the casing wall. Should the arms tend to stick against the wall during their downward travel, the mandrel continues downward through the barrel, and wedge cam 26 causes the lower ends of the arms to move radially inward to clear the casing. Should it be desired to lock the tool so that the arms are either in their intermediate or closed positions during the lowering of the tool into the well, this may be done as previously described, and when the tool becomes lowered to the location of the fish, the arms may then be spread by turning the drill stem to bring the mandrel out of registration with the bushing slots and to permit the tool to assume the expanded position of Fig. 1.

Assuming that a lost article or fish 40 is lodged at the bottom of the well, generally indicated at 41, in Fig. 2, the tool is lowered to such position that the arms are in a general surrounding position about the fish, and that their downward movement, and therefore the downward movement of the barrel, is stopped by virtue of the engagement of the stops 51, 51a or 55 with the top of the fish, or the bottoming of the arms. It is seen that with the arms 19 in an open position, the lower wedge cam 29 is moved downward away from collar 28 compressing spring 33 due to the downward thrust exerted on the cam by means of lugs 20, these lugs being urged radially inward to tightly engage the cam by virtue of resistance by the arms to outward flexure due to their resiliency. After turning the pipe string to move the mandrel lug into opening O, see Fig. 3, the string is then lowered causing mandrel 10 to move downwardly within the barrel, and lug 25 to be lowered within the semi-circular opening O. Due to the downward movement of the mandrel, spring 31 becomes compressed and exerts a downward thrust on the upper wedge cam 26 causing the upper ends of the arms to be urged radially outward and their lower ends radially inward to such degree as to cause the arms to bend outwardly along their lower extents. Simultaneously, the lower spring 33 is somewhat relieved from compression and the upward thrust on cam 29 thereby lessened.

It may be noted that during an early portion of the downward movement of the mandrel from the position of Fig. 1, cam 29 has delayed movement, or, more specifically, the cam remains substantially stationary with respect to lugs 20 until bearing 30 engages collar 28, this point of engagement corresponding approximately to the intermediate adjustment position D of the mandrel. Further lowering of the mandrel is accompanied by downward movement of cam 29 by lugs 20 causing them to assume the limiting and innermost positions shown in Fig. 2. Whether the mandrel be adjusted in slots D or E to lock the arms in work engaging position in any given instance, obviously is determined by the size of the fish.

It will be apparent from the foregoing that by virtue of the described actions of springs 31 and 33, in conjunction with cams 26 and 29, the grapple arms, upon downward movement of the mandrel, are caused not merely to be moved radially inward at their lower ends but are constantly subjected to stress causing them to flex outwardly along their lower portions. Consequently, when the arms are brought into engagement with the fish they are caused to securely grip the fish by virtue of both the lever action imposed by cam 26 and the flexure stresses set up in the resilient arms.

With the arm in work engaging position, and with the mandrel lug positioned in the segmental collar slots C or D, for instance as illustrated in Fig. 2, it will be apparent that as the tool with its engaged fish is raised within the well, the mandrel is locked within the barrel against relative vertical movement and therefore, the arms having been thrust into tight engagement with the fish as previously described, this condition is maintained throughout the entire upward travel of the tool with the fish until the latter is recovered.

Should the arms fail to grip the fish in one operation as described, the mandrel may be turned to bring lug 25 into opening O and the mandrel raised relative to the barrel until the parts are again in the position of Fig. 1. In this stop it will be seen that the lower cam being urged against the arms by spring 33, serves to spread them in readiness for repeating the operation of gripping the fish.

It has been mentioned previously that the grapple arms are capable of spreading to extents greater than the cross section area of the well casing. Referring to Fig. 9, a "cave in" region R, in the well is shown below the casing W, a fish 40a being inclined within the cave portion. Immediately upon passing beyond the lower extent of the casing, or into the void below, the arms are permitted to spring into wide open position, the parts being as shown in Fig. 1, and may be locked in this position by thrusting the mandrel lug into slots C. Thereupon the pipe string may be alternately raised and lowered causing the arms to dig into the cave region so as to get into position behind the fish, and then by turning the tool the fish may be worked outwardly to a central position within the well and to such position that the tool may be suitably applied to grip the fish. The advantage of having a single tool with which fishing operations may be carried out not only within a bore of constant area, such as the well casing, but also within undimensionable regions corresponding to the described cave portion, will be readily appreciated by those familiar with the art.

I claim:

1. In a device of the character described, a barrel and a vertically extending mandrel within the barrel arranged for vertical movement relative thereto, a vertically extending arm having pivotal connection intermediate its ends with said barrel, and a pair of cams mounted on said mandrel, one above and the other below said pivotal connection, said cams each being adapted to engage and swing the arm radially in opposite directions when the mandrel is moved vertically in opposite directions.

2. In a device of the character described, a barrel and a vertically extending mandrel within the barrel arranged for vertical movement relative thereto, a vertically extending arm having pivotal connection intermediate its ends with said barrel, and a pair of cams mounted on said mandrel, one above and the other below said pivotal connection, said cams being adapted to yieldably press against said arm and to tend to swing it radially in opposite directions.

3. In a device of the character described, a barrel and a vertically extending mandrel within the barrel arranged for vertical movement relative thereto, a vertically extending arm pivotally yieldably supported on said barrel, and a cam mounted on the mandrel and adapted to press against said arm to move it pivotally.

4. In a device of the character described, a barrel and a vertically extending mandrel within the barrel arranged for vertical movement relative thereto, a vertically extending arm pivotally mounted on said barrel, a cam slidably mounted on the mandrel, and yielding means urging said cam against the arm to move it pivotally.

5. In a device of the character described, a barrel and a vertically extending mandrel within the barrel arranged for vertical movement relative thereto, a vertically extending and resiliently flexible grapple arm having pivotal connection intermediate its ends with said barrel, and means within the barrel adapted to yieldably engage and move the upper end of said arm radially outward and thereby to urge a lower portion of the arm radially inward against the work to such degree as to cause the arm to bend outwardly along its lower extent.

6. In a device of the character described, a barrel and a vertically extending mandrel within the barrel arranged for vertical movement relative thereto, a vertically extending and resilient grapple arm having pivotal connection intermediate its ends with said barrel, a cam slidably mounted on said mandrel within the barrel and adapted to engage the arm, and yielding means urging said cam to move the upper end of said arm radially outward and thereby to urge a lower portion of the arm radially inward against the work to such degree as to cause the arm to bend along its lower extent.

7. In a device of the character described, a barrel and a vertically extending mandrel within the barrel arranged for vertical movement relative thereto, a vertically extending arm having pivotal connection intermediate its ends with said barrel and yieldably supported wedge means associated with said mandrel adapted to engage the arm below its pivotal connection to cause said arm to bend outwardly along its lower extent.

8. In a device of the character described, a barrel and a vertically extending mandrel within the barrel arranged for vertical movement relative thereto, a vertically extending arm having pivotal connection intermediate its ends with said barrel, a conically shaped and spring supported wedge cam mounted on said mandrel and adapted to engage the arm below its pivotal connection to cause said arm to bend outwardly along its lower extent.

9. In a device of the character described, a barrel and a vertically extending mandrel within the barrel arranged for vertical movement relative thereto, a vertically extending arm having pivotal connection intermediate its ends with said barrel, a pair of cams mounted on said mandrel, one above and the other below said pivotal connection, said cams being adapted to swing the arm radially in opposite directions when the mandrel is moved vertically in opposite directions, yielding means urging the lower cam upward to move the lower portion of said arm radially outward and yielding means urging the upper cam downward to move the lower portions of said arm radially outward, both said yielding means being of such strength as to cause the arm to bend outwardly along its lower extent.

10. In a device of the character described, a barrel and a vertically extending mandrel within the barrel arranged for vertical movement relative thereto, a vertically extending arm having pivotal connection intermediate its ends with said barrel, a pair of cams mounted on said mandrel, one above and the other below said pivotal connection, said cams being adapted to engage cam faces on said arm to swing the arm radially in opposite directions when the mandrel is moved vertically in opposite directions, the upper cam having a downwardly and inwardly inclined cam face of relatively less angularity and the upper cam having a downwardly and outwardly inclined cam face of relatively greater angularity.

11. In a device of the character described, a barrel and a vertically extending mandrel within the barrel arranged for vertical movement relative thereto, a vertically extending and resilient arm having pivotal connection intermediate its ends with said barrel, a pair of cams mounted on said mandrel, one above and the other below said pivotal connection, said cams being adapted to engage cam faces on said arm to swing the arm radially in opposite directions when the mandrel is moved vertically in opposite directions, the upper cam having a downwardly and inwardly inclined cam face of relatively less angularity and the upper cam having a downwardly and outwardly inclined cam face of relatively greater angularity, said upper cam permitting the upper end of the arm to move radially inward when said mandrel is raised, and said lower cam simultaneously causing the arm to bend outwardly along its lower extent.

12. In a device of the character described, a barrel and a vertically extending mandrel within the barrel arranged for vertical movement relative thereto, a vertically extending and resilient arm having pivotal connection intermediate its ends with said barrel, a pair of cams mounted on said mandrel, one above and the other below said pivotal connection, said cams being adapted to swing the arm radially in opposite directions when the mandrel is moved vertically in opposite directions, the upper cam having a downwardly and inwardly inclined cam face of relatively less angularity and the lower cam having a downwardly and outwardly inclined cam face of relatively greater angularity, said upper cam permitting the upper end of the arm to move radially inward when said mandrel is raised, and the lower cam simultaneously causing the arm to bend outwardly along its lower extent, yielding means urging the upper cam downward and yielding means urging the lower cam upward.

13. In a device of the character described, a barrel and a vertically extending mandrel within the barrel arranged for vertical movement relative thereto, a vertically extending arm having pivotal connection intermediate its ends with said barrel, a pair of cams mounted on said mandrel, one above and the other below said pivotal connection, said cams being adapted to swing the arm radially in opposite directions when the mandrel is moved vertically in opposite directions, and means for locking the mandrel at vertical intervals against vertical movement relative to the barrel.

14. A device of the character described embodying a barrel, a mandrel extending within the barrel and longitudinally movable with relation thereto, a grapple arm mounted on said barrel, and means exclusive of said arm for locking the barrel and mandrel against relative vertical movement.

15. A device of the character described embodying a barrel, a mandrel extending within the barrel and longitudinally movable with relation thereto, and means for locking the barrel and mandrel against relative vertical movement at predetermined vertical intervals.

16. A device of the character described embodying a barrel, a mandrel extending within the barrel and longitudinally and rotatably movable with relation thereto, said barrel having on its bore wall a shoulder, and a lug on said mandrel adapted to be brought to bear against said shoulder to prevent vertical movement of the mandrel with respect to said barrel by rotating the mandrel relative to the barrel.

17. A device of the character described embodying a vertically extending barrel, a mandrel within the barrel and longitudinally and rotatably movable with relation thereto, a bushing within the upper end of said barrel and having a lower segmental collar-shaped portion slotted at its sides at vertically spaced intervals, and a circular segmental flange lug on the mandrel adapted to fit in said slots and having an arcuate extent less than that of said segmental collar member, the mandrel being adapted to be held vertically stationary relative to the barrel at said vertically spaced intervals by turning the mandrel so that the lug is fitted into said slots.

18. A fishing tool embodying, a barrel and a vertically extending mandrel within the barrel arranged for vertical movement relative thereto, a vertically extending arm having pivotal connection intermediate its ends with said barrel, a pair of cams mounted on said mandrel, one above and the other below said pivotal connection, said cams being adapted to swing the arm radially in opposite directions when the mandrel is moved vertically in opposite directions, and a stop on said arm below the lower cam and adapted to engage the fish to hold said barrel and arms relatively stationary while the mandrel moves relatively downward.

19. In a device of the character described, a barrel and a vertically extending mandrel within the barrel arranged for vertical movement relative thereto, a vertically extending arm having pivotal connection intermediate its ends with said barrel, and a pair of relatively vertically movable cams mounted on said mandrel, one above and the other below said pivotal connection, said cams each being adapted to engage and swing the arm radially in opposite directions when the mandrel is moved vertically in opposite directions, and the upper cam being caused to engage said arm substantially at its upper end.

20. In a device of the character described, a barrel and a vertically extending mandrel within the barrel arranged for vertical movement relative thereto, a vertically extending arm pivotally mounted on said barrel, and a cam yieldably supported on the mandrel and adapted to press against substantially the upper end of said arm to move it pivotally.

21. In a device of the character described, a barrel and a vertically extending mandrel within the barrel arranged for vertical movement relative thereto, a vertically extending arm pivotally mounted on said barrel, and a cam yieldably supported on the mandrel and adapted to press against said arm at a point below its pivot, to swing the arm pivotally.

22. In a fishing tool, a grapple arm supporting body, a mandrel within said body, a longitudinally flexible and resilient grapple arm mounted on said body and movable radially relative therto, and means on said mandrel below the point of attachment of said arm to said body for putting the arm under bending strain.

23. In a fishing tool, a grapple arm supporting body, a mandrel within said body, a longitudinally flexible and resilient grapple arm pivotally mounted on said body and movable radially relative thereto, and yieldably supported means on said mandrel below the point of attachment of said arm to said body for putting the arm under bending strain.

24. A fishing tool comprising a barrel, a vertically extending resilient grapple arm pivotally mounted intermediate its ends on said barrel and movable radially relative thereto, and means adapted to yieldably engage substantially the upper end of said arm to move the lower portion of said arm radially inward against the work and to cause the arm to bend outwardly along its lower extent.

25. In a device of the character described, a barrel and a vertically extending mandrel within the barrel arranged for vertical movement relative thereto, a vertically extending and resilient flexible grapple arm having pivotal connection intermediate its ends with said barrel, and means on said mandrel adapted to yieldably engage substantially the upper end of said arm to move the lower portion of said arm radially inward against the work and to cause the arm to bend outwardly along its lower extent.

In witness that I claim the foregoing I have hereunto subscribed my name this 19th day of September, 1928.

ELMER E. PRYOR.

CERTIFICATE OF CORRECTION.

Patent No. 1,801,456.  Granted April 21, 1931, to

ELMER E. PRYOR.

It is hereby certified that error appears in the printed specification of the above numbered patent requiring correction as follows: Page 5, claim 3, lines 29 and 30, strike out "yieldably supported on said barrel, and a cam mounted" and insert instead mounted on said barrel, and a cam yieldably supported; page 7, line 19, claim 22, for "therto" read thereto; and that the said Letters Patent should be read with these corrections therein that the same may conform to the record of the case in the Patent Office.

Signed and sealed this 29th day of September, A. D. 1931.

(Seal)

M. J. Moore,
Acting Commissioner of Patents.